ated Jan. 23, 1968

United States Patent Office 3,365,434
Patented Jan. 23, 1968

3,365,434
METAL-REDUCED TRANSITION METAL
HALIDE CATALYST
Harry W. Coover, Jr., Kingsport, Tenn., and Newton H. Shearer, Jr., Zurich, Switzerland, assignors to Eastman Kodak Company, Rochester, N.Y., a corporation of New Jersey
No Drawing. Filed Sept. 5, 1963, Ser. No. 306,691
20 Claims. (Cl. 260—93.7)

This invention relates to a new and improved process for the polymerization of olefinic hydrocarbons. In one aspect this invention relates to a novel procedure for preparing an improved catalyst for the polymerization of olefinic hydrocarbons to form solid, high molecular weight, highly crystalline polymers. In another aspect, this invention relates to a process for producing a novel catalyst for polymerizing propylene to form solid, high molecular weight, highly crystalline polymer.

Catalysts for the polymerization of propylene and its homologs to solid, crystalline polymer have been prepared by reducing a transition metal compound with a suitable reducing metal, for example a metal from Groups I, II and IIIa of the Periodic Table. The catalyst is prepared using proportions of the reducing metal and transition metal compound such that the resulting mixture contains a catalytically effective amount of the metal and a reduced transition metal halide. For example, when aluminum is used to reduce titanium tetrachloride and when the molar ratio of aluminum to titanium tetrachloride is 4 to 3 the resulting product is an equimolar ratio of aluminum and titanium trichloride. This catalytic mixture is quite effective for polymerizing propylene and its homologs to solid, crystalline polymer without the addition of any other reducing compound, such as an organo-metallic compound or a metal hydride. However, the catalytic mixture that is produced in this manner has been found to be somewhat less effective catalytically than other anionic catalyst systems and efforts have been made to improve the effectiveness of these catalyst systems.

It is an object of this invention to provide a novel process for the production of a highly effective catalyst system for polymerizing propylene and its homologs to solid, crystalline polymer. It is another object of this invention to provide a novel process for treating a catalyst system prepared by reacting a transition metal compound with a reducing metal to improve substantially the catalytic activity of the reaction mixture. It is a further object of this invention to provide a novel polymerization catalyst system of improved catalytic activity. Further and additional objects of this invention will be apparent from the detailed disclosure that follows.

In accordance with our invention we have found that a catalyst system of substantially improved catalytic activity and useful for the polymerization of olefinic hydrocarbons to form solid, crystalline polymer can be prepared by reducing a transition metal compound with a metal selected from Groups I, II and IIIa of the Periodic Table to form a reaction mixture containing catalytically effective amounts of metal and reduced transition metal compound and after the desired reduction has taken place treating the reaction mixture with a liquid organic halide in order to increase the catalytic activity of the reaction mixture. Treatment of the catalyst with a liquid organic halide in accordance with our invention can result in a tenfold or greater increase in the catalytic activity of the catalyst. The increase in catalytic activity is demonstrated by an unexpected yield in the amount of polymer that is produced without any substantial undesirable affect upon the properties of the polymer.

The reducing metals that can be used in practicing our invention are selected from Groups I, II and IIIa of the Periodic Table. Among these reducing metals are sodium, lithium, potassium, rubidium, cesium, beryllium, magnesium, zinc, calcium, strontium, barium, indium, thallium, aluminum and gallium. It is preferred to employ aluminum or an alkali metal selected from the group consisting of sodium, potassium and lithium or an alloy of metals containing aluminum or said alkali metal.

The transition metal compound can be a halide or an alkoxyhalide of a metal from Groups IV to VIII of the Periodic Table, preferably titanium, zirconium, vanadium, molybdenum or chromium and the halogen atoms are selected from the group consisting of chlorine, bromine and iodine. For example, titanium tetrachloride, zirconium tetrachloride, titanium tetrabromide, titanium tetraiodide, dibutoxy titanium dichloride, vanadium tetrachloride, chromic chloride, molybdenum pentachloride, diethoxy titanium dichloride and the like can be used in practicing our invention. Prior to reduction, the transition metal is at its maximum valence and during the reduction a lower valency form of the transition metal is produced. We prefer to employ titanium tetrachloride in our process, and, as a result of the reduction reaction, titanium trichloride is formed.

To obtain the most desirable results from our invention it is preferable to carry out the reduction reaction in the presence of a complexing agent. The complexing agent that is used in our process forms a complex with the reducing metal halide produced in the reduction reaction. The resulting complex is soluble in the complexing agent, and in most instances the complex is also soluble in common organic solvents, such as toluene, xylene, benzene, and the like. As complexing agent or medium for carrying out the transition metal halide reduction reaction we prefer to employ a diaryl ether. Among the diaryl ethers that can be used are diphenyl ether, ditolyl ether, dixylyl ether, phenyltolyl ether, di(biphenyl)ether, diphenylphenyl ether, di(ethylphenyl)ether, di(propylphenyl)-ether, di(n-butylphenyl)ether and the like. We prefer to employ diphenyl ether in our process, and, if desired, the diphenyl ether can be used in admixture with biphenyl which is commonly known as Dowtherm.

Other complexing agents that can be used are amides, such as N,N-dimethylformamide, acetamide, N,N-dimethylacetamide, propionamide and the like. Ketones, such as benzophenone, acetophenone, butyrone and 3-pentanone are similarly useful in our process. Carboxylic esters, such as ethyl benzoate, ethyl malonate, butyl succinate, propyl adipate, ethyl sebacate, butyl naphthoate, and the like are useful as complexing agents, and similarly phenols such as p-cresol, o-ethyl phenol, m-propyl phenol and other similar alkyl phenols are useful in our process. Nitro-containing compounds and nitrile-containing compounds such as nitrobenzene, p-nitrotoluene, 2-nitro-p-cymene, benzonitrile, butyronitrile, capronitrile, 2-naphthonitrile and the like can also be employed. The organic sulfur compounds, such as dimethyl sulfoxide, dimethyl sulfone, diethyl sulfate, N,N-dimethylbenzene sulfonamide, dimethyl sulfoximine, dibutyl sulfoxide, dioctyl sulfone, diphenyl sulfate, N,N-dipropyl benzene sulfonamide, diethyl sulfoxide, and the like, are useful in our process. We have also found that organophosphorus compounds, such as hexaalkyl phosphoramides, trialkyl and triaryl phosphates and trialkyl and triaryl phosphites are useful as reaction media or complexing agents. For example, hexamethyl phosphoric triamide, triphenyl phosphate, tricresyl phosphate, tridecyl phosphite, triethyl phosphite, triphenyl phosphite, triethyl phosphate, hexabutyl phosphoric triamide, hexaoctyl phosphoric triamide and the like can be similarly employed. In the organophosphorus compounds, the alkyl radicals usually contain 1 to 8 carbon atoms.

The liquid organic halide that is used for catalyst treatment improves the activity of the catalyst although it is substantially inert to the reduced transition metal compounds. Alkyl halides, cycloalkyl halides, aryl halides and aralkyl-halides are quite effective in our process. Also halo-ethers, halo-esters and halo-ketones can be used. The halides are preferably the chlorides, but the corresponding bromides and iodides can also be used. Typical organic halides useful in our process are butyl chloride, 1,5-dichloropentane, dibromomethane, benzyl chloride, phenyl bromide, cyclohexyl chloride, amyl chloride, acetyl chloride, 3,3'-dichlorobiphenyl, methylene bromide, chloroform, carbon tetrachloride, ethylidene chloride, 4-chlorophenyl-2-chloroethyl ether, 1,3-dibromoacetone, β-iodoethyl acetate and similar organic halides.

The details of the reduction reaction will be described using aluminum as the reducing metal and titanium tetrachloride as the transition metal to be reduced. The reaction will be carried out in the presence of diphenyl ether as the complexing agent or reaction medium although the reaction can be conducted in the absence of the complexing agent. Any of the reducing metals, transition metal halides and complexing agents set forth above can be similarly employed in the practice of our invention. The titanium tetrachloride is reduced to titanium trichloride with aluminum metal in diphenyl ether at a temperature usually within the range of −80 to 270° C., preferably −40 to 250° C. In the reaction from 0.5 to 5.0, preferably 0.9 to 1.5, times the stoichiometric quantity of aluminum required to reduce the titanium tetrachloride to titanium trichloride is used. When the reduction reaction is conducted in the presence of diphenyl ether, aluminum chloride formed during the reaction and diphenyl ether form a complex. As a result of the formation of this complex, co-crystallization of the aluminum chloride and the titanium trichloride is prevented and the removal of aluminum chloride from the reaction mixture is facilitated. The aluminum chloride can be removed by filtering the hot reaction mixture, usually at the temperature used for the reduction reaction, since the aluminum chloride-diphenyl ether complex is soluble in the diphenyl ether at reduction reaction temperatures. After filtration, the solid product can be washed with fresh hot diphenyl ether, and subsequently, with toluene or other organic solvent. The reduction reaction is carried out in such a manner and with suitable ratios of reactants that the product contains titanium trichloride and unreacted aluminum, and this product is an effective olefin polymerization catalyst. An excellent catalyst having a 1:1 molar ratio of aluminum and titanium trichloride is formed by using a 4:3 molar ratio of aluminum and titanium tetrachloride. Similarly, a 2:1 molar ratio of alkali metal and titanium tetrachloride produces an excellent catalyst. The catalyst produced in the presence of the complexing agent contains less than a one percent by weight of aluminum chloride. It is not essential that the aluminum chloride-diphenyl ether complex be separated from the catalyst in order that the catalyst will be effective for polymerizing olefins. Thus, the hot reduction reaction mixture can be cooled prior to filtering and in that event the titanium trichloride is admixed with aluminum chloride-diphenyl ether complex. The reaction product actually contains substantially no free or uncomplexed aluminum chloride and the reaction product prepared in this manner can be used effectively as a catalyst component in olefin polymerization reactions.

The reduction reaction product made in this manner is contacted with liquid organic halide to substantially increase the catalytic activity of the product, and any suitable method of contacting, can be used. The contacting can be effectively accomplished by washing the product with liquid organic halide. The reaction product can be slurried in the liquid organic halide or the latter can be passed through a bed of the solid product. After contact with liquid organic halide, the reaction product is usually dried prior to use in an olefin polymerization reaction. The molar ratio of liquid organic halide to reduced transition metal compound is within the range of 0.1:1 to 20:1, preferably 0.5:1 to 10:1.

If desired, in the titanium tetrachloride reduction reaction from 1 to about 30 mole percent of the titanium tetrachloride can be replaced by another transition metal halide, such as vanadium tetrachloride, zirconium tetrachloride, molybdenum pentachloride, chromic chloride, and the like. The resulting mixture of transition metal halides can be reduced with reducing metal in the manner described above and the resulting product can be similarly employed in olefin polymerization reactions. The titanium trichloride in our process has been found to contain no titanium dichloride. Thus, in the reduction reaction, the titanium tetrachloride is converted or reduced to the titanium trichloride without the formation of any titanium dichloride.

The reduction reaction product that is produced in our process can be employed in olefin polymerization reactions for the preparation of solid, high molecular weight, crystalline polymers. The polymerization reaction can be carried out in liquid phase in an inert organic liquid and preferably an inert liquid hydrocarbon vehicle, but excellent results can be obtained in liquid monomer without using a solvent. The reaction proceeds with excellent results over a temperature range of from 0° C. to 250° C., but temperatures outside this range can be used if desired. Likewise, the reaction pressures may be varied widely from about atmospheric pressure to very high pressures of the order of 20,000 p.s.i. or higher. The liquid vehicle employed is desirably one which serves as an inert liquid reaction medium.

The polymerization reaction is employed in the preparation of highly crystalline polypropylene, the polybutenes and polystyrene although it can be used for polymerizing mixtures of ethylene and propylene as well as other α-monoolefins containing up to 10 carbon atoms. The polypropylene produced in accordance with this invention is a highly crystalline polymer that can be used in molding operations to form products of excellent clarity. The high molecular weight, high density polymers of this invention are insoluble in solvents at ordinary temperatures, but they are soluble in such solvents as xylene, toluene, or tetralin at elevated temperatures. These solubility characteristics make it possible to carry out the polymerization process under conditions wherein the polymer formed is soluble in the reaction medium during the polymerization and can be precipitated therefrom by lowering the temperature of the resulting mixture.

The polypropylene, polystyrene, polybutenes and other polyolefins prepared in accordance with the invention can be molded or extruded and can be used to form plates, sheets, films or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polymers obtained according to this process.

The polymerization reaction can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution process it is preferred to use a concentration from about 2 to about 10% by weight based on the weight of the vehicle and for a slurry type of process higher concentrations, for example, up to 40% and higher are preferred. Higher concentrations of monomer ordinarily increase the rate of polymerization, but concentrations of 5 to 10% by weight in a solution process are ordinarily less desirable because the polymer dissolved in the reaction medium results in a very viscous solution.

The organic vehicle employed in the polymerization reaction can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalene, n-octane, isooctane, methyl cyclohexane, tetralin, decalin, and any of the other well known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The polymerization reaction has been described above as being effective primarily for the polymerization of α-monoolefins. This process can also be used for polymerizing other α-monoolefins, and it is not necessary to limit the process of the invention to monoolefins. Other α-olefins that can be used are butadiene, isoprene, 1,3-pentadiene and the like.

The following examples are illustrative of the results obtainable by practicing our invention.

*Example 1*

In a 2-liter flask equipped with high-speed stirrer, reflux condenser, and dropping funnel a solution of 61.6 grams of titanium tetrachloride in 1 liter of a eutectic mixture of diphenyl ether and biphenyl was heated under an argon atmosphere. This solution was heated to 170° C. and a slurry of fine (150–300 mesh) aluminum powder was added slowly. The reaction flask was transferred to an argon-filled dry box, where the reaction mixture was filtered while still hot (75° C.). The product thus obtained was washed with 500 ml. of dry toluene, then with 500 ml. of dry petroleum ether. The product, which was dried under vacuum at 100° C., weighed 46.5 grams (93% of theory).

One gram of this product was placed in a stainless steel autoclave with 200 ml. of liquid propylene. The temperature was raised to 85° C. and the autoclave was rocked at this temperature for 4 hours. When the autoclave was cooled and opened, a yield of 14 grams of highly crystalline polypropylene was obtained.

*Example 2*

The procedure of Example 1 was followed, except the petroleum ether wash was replaced by a wash with cyclohexyl chloride. When 0.68 gram of reduction reaction product was rocked with 200 ml. of propylene at 85° C., a yield of 96 grams of highly crystalline polypropylene was obtained. The inherent viscosity of this product was 2.98.

*Example 3*

The procedure of Example 2 was followed, except the aluminum was replaced by 2.28 grams of lithium dispersed in petroleum jelly, and amyl chloride was used instead of the cyclohexyl compound. In the polymerization test 94 grams of highly crystalline polypropylene was obtained. Similar results were obtained with 3-methyl-1-butene and 4-methyl-1-pentene when used in place of propylene monomer.

*Example 4*

The procedure of Example 2 was followed, but finely divided magnesium (4.0 g.) was used and the reduction reaction product was washed with benzyl chloride. One gram of this product polymerized 89 grams of 3-methyl-1-hexene in 4 hours. Similar results were obtained in the polymerization of allyl cyclohexane.

*Example 5*

The procedure of Example 2 was followed, but 6.6 g. of calcium filings was used instead of aluminum, and the reduction reaction product was washed with acetyl chloride. When 1 gram of the product was used to polymerize a mixture of 50 grams of propylene and 50 grams of 1-butene, a yield of 80 grams of copolymer was obtained which contained 43.8% 1-butene and 56.2% propylene. Similar results were obtained with a mixture of propylene and 1-pentene.

*Example 6*

The procedure of Example 1 was followed, but a reaction medium composed of 25% of 3,3'-dichlorobiphenyl and 75% of diphenyl ether was used. The reaction mixture was allowed to cool before filtration. In the polymerization test, a yield of 98 grams of highly crystalline polypropylene was obtained. Similar results were obtained when lithium, magnesium, calcium and zinc were used instead of aluminum.

Example 7

The procedure of Example 6 was used, but zirconium tetrachloride was used instead of titanium tetrachloride, and an alloy of magnesium and aluminum (magnalium) was used instead of aluminum. A yield of 93 grams of crystalline poly-1-butene was obtained from 100 grams of monomer. The use of vanadium tetrachloride instead of zirconium tetrachloride gave similar results.

Example 8

The procedure of Example 6 was followed, but lithium-aluminum alloy ($Li_3Al$) was used instead of aluminum. This was an extremely active catalyst, 0.25 gram of catalyst giving 87 grams of 97% crystalline polypropylene in 1 hour.

Example 9

The procedure of Example 6 was used, but chromic chloride was used instead of titanium tetrachloride, and an alloy of 74% potassium and 26% sodium was substituted for the aluminum. A yield of 92 grams of poly-3,5,5-trimethyl-1-hexene was obtained from 100 grams of monomer. Similar results were obtained when molybdenum pentachloride was used instead of the chromium compound.

Example 10

The procedure of Example 2 was followed, but the product was washed with methylene bromide instead of cyclohexyl chloride. The resultant catalyst (0.5 g.) was used to polymerize ethylene in a stainless steel autoclave at 300 p.s.i. at 70° C. A yield of 75 grams of polyethylene was obtained in 2 hours. Similarly, chloroform, carbon tetrachloride, 1,5-dichloropentane, and ethylidene chloride can be used.

Example 11

The procedure of Example 1 was followed, but a reaction medium of 10% 4-chlorophenyl-2-chloroethyl ether and 90% diphenyl ether was used. When the resultant catalyst was used for olefin polymerization at 40° C. a yield of 82 grams was obtained. The inherent viscosity of this polymer was 4.37. When the same catalyst was used at 175° C, a yield of 93 grams of polymer having an inherent viscosity of 0.98 was obtained. Similar results were obtained when 1,3-dibromoacetone or β-iodoethyl acetate were used in place of the chloro-ether.

A co-reducing agent can be used with the Group I, II and IIIa reducing metal in practicing our invention. The co-reducing agents that can be employed in the practice of our invention to assist in the production of a reduced transition metal compound are compounds of metals in Groups Ia, II and IIIa of the Periodic Table. These compounds can be the alkyl, phenyl or hydride derivatives of the metals in Groups Ia, II and IIIa or the complex hydride, alkyl or phenyl derivatives of aluminum and an alkali metal. Also, organoaluminum halides, having the formula $R_mAlX_n$ and $R_3Al_2X_3$ wherein R is a hydrocarbon radical selected from the group consisting of lower alkyl, cycloalkyl, phenyl and tolyl, and X is a halogen selected from the group consisting of chlorine and bromine, and m and n are integers whose sum is equivalent to the valence of aluminum, can be used as co-reducing agents. Similarly, organomagnesium compounds, having the formula RMgX wherein R and X are as defined above for the organoaluminum compounds, are useful in the practice of our invention. Typical co-reducing agents that can be used are the trialkyl and triphenyl aluminum compounds, trialkyl boron, lithium aluminum hydride and lithium aluminum tetraalkyl; dialkyl aluminum chloride, alkyl aluminum dichloride, alkyl aluminum sesquichloride, dialkyl aluminum hydride, sodium hydride, potassium hydride, lithium hydride, alkyl lithium, phenyl lithium, dialkyl zinc, alkyl magnesium chloride, sodium alkyl and the like. In the co-reducing agents set forth above the alkyl radicals can contain from 1 to 12 carbon atoms.

The amount of co-reducing agent that is used can be varied widely but the most useful range is from about 0.1 mole percent to 10 mole percent based on the stoichiometric number of moles of reducing metal that is employed. If desired, however, the amount of co-reducing agent can be as high as 25 mole percent and 50 mole percent can be used if desired. The co-reducing agents can be used to decrease the amount of reducing metal that is employed to reduce the transition metal compound, and in some instances, it may be useful to use the co-reducing agent in addition to the usual amount of reducing metal and thus to increase the total amount of reducing agent employed in the reaction. It is important, however, to carry out the reduction with the reducing metal and co-reducing agent in situ. This is accomplished as a practical matter by adding a slurry containing the reducing metal in powder form and the co-reducing agent to a solution of the transition metal compound that is to be reduced. The reverse addition of reactants can be used, but more reproducible results are obtained by adding the mixture of reducing agents to the transition metal halide.

Although the invention has been described in detail with reference to certain preferred embodiments thereof, variations and modifications can be effected within the spirit and scope of the invention as described hereinabove and as defined in the appended claims.

We claim:

1. In a process for the preparation of a catalyst system for the polymerization of olefinic hydrocarbon to form solid polymer wherein a transition metal compound having said transition metal at the maximum valence is reduced with a metal selected from Groups I, II and IIIa of the Periodic Table to form a catalyst system containing catalytically effective amounts of metal and reduced transition metal compound, the improvement which comprises washing said catalyst system after formation with a liquid organic halide substantially inert to the reduced transition metal compound whereby the catalytic activity of said catalyst system is substantially increased.

2. In a process for the preperation of a catalyst system for the polymerization of olefinic hydrocarbon to form solid polymer wherein a transition metal halide having said transition metal at the maximum valence is reduced with an alkali metal to form a catalyst system containing catalytically effective amounts of alkali metal and reduced transition metal halide, the improvement which comprises washing said catalyst system after formation with a liquid organic halide substantially inert to the reduced transition metal compound whereby the catalytic activity of said catalyst system is substantially increased.

3. In a process for the preparation of a catalyst system for the polymerization of olefinic hydrocarbon to form solid polymer wherein a transition metal halide having said transition metal at the maximum valence is reduced with aluminum to form a catalyst system containing catalytically effective amounts of aluminum and reduced transition metal halide, the improvement which comprises washing said catalyst system after formation with a liquid organic halide substantially inert to the reduced transition metal compound whereby the catalytic activity of said catalyst system is substantially increased.

4. The method for producing a catalyst system effective for the polymerization of olefinic hydrocarbon to form solid polymer which comprises reacting a transition metal halide having said transition metal at the maximum valence with a metal selected from Groups I, II and IIIa of the Periodic Table to form a reduced halide of said metal in the presence of a complexing agent that forms a complex with said halide of said metal, said complex being subsatntially soluble in said complexing agent and washing the catalyst after formation with a liquid organic halide substantially inert to the reduced halide to increase substantially the catalytic activity of said catalyst.

5. The method for producing a catalyst system effective for the polymerization of propylene to form solid polymer which comprises reacting a transition metal halide having said transition metal at the maximum valence with an alkali metal to form a reduced halide of said alkali metal in the presence of a complexing agent that forms a complex with said halide of said alkali metal, said complex being substantially soluble in said complexing agent and washing the catalyst after formation with a liquid organic halide substantially inert to the reduced halide to increase substantially the catalytic activity of said catalyst.

6. The method for producing a catalyst system effective for the polymerization of propylene to form solid polymer which comprises reacting a transition metal halide having said transition metal at the maximum valence with aluminum to form a halide of said aluminum in the presence of a complexing agent that forms a complex with said halide of said aluminum, said complex being substantially soluble in said complexing agent and washing catalyst after formation with a liquid organic halide substantially inert to the halide of aluminum formed to increase substantially the catalytic activity of said catalyst.

7. The method for producing a catalyst system effective for the polymerization of propylene to form solid polymer which comprises reacting titanium tetrachloride with aluminum in the presence of diphenyl ether to form a complex of diphenyl ether and aluminum trichloride, said complex being substantially soluble in said diphenyl ether and washing the catalyst after formation with a liquid organic halide substantially inert to said aluminum trichloride to increase substantailly the catalytic activity of said catalyst.

8. The method according to claim 7 wherein the liquid organic halide is an alkyl halide.

9. The method according to claim 7 wherein the liquid organic halide is amyl chloride.

10. The method according to claim 7 wherein the liquid organic halide is cyclohexyl chloride.

11. The method according to claim 7 wherein the liquid organic halide is benzyl chloride.

12. The method for producing solid, crystalline polymer which comprises polymerizing olefinic hydrocarbon in the presence of a catalyst system formed by reducing a transition metal compound having said transition metal at the maximum valence with a metal selected from Groups I, II and IIIa of the Periodic Table and washing the resulting catalyst with a liquid organic halide substantially inert to said reduced transition metal compound to increase substantially the catalytic atcivity of said catalyst system.

13. The method for producing solid, crystalline polypropylene which comprises polymerizing propylene in the presence of a catalyst system formed by reducing a transition metal halide having said transition metal at the maximum valence with an alkali metal and washing the resulting catalyst with a liquid organic halide substantially inert to the reduced transition metal halide to increase substantially the catalytic activity of said catalyst system.

14. The method for producing solid, crystalline polypropylene which comprises polymerizing propylene in the presence of a catalyst system formed by reducing a transition metal halide having said transition metal at the maximum valence with aluminum and washing the resulting catalyst with a liquid organic halide substantially inert to the reduced transition metal halide to increase substantially the catalytic activity of said catalyst system.

15. The method for producing solid, crystalline copolymer which comprises polymerizing a mixture of propylene and 1-butene in the presence of a catalyst system formed by reducing a transition metal halide having said transition metal at the maximum valence with aluminum and washing the resulting catalyst with a liquid organic halide substantially inert to the reduced transition metal halide to increase substantially the catalytic activity of said catalyst system.

16. The method for producing solid, crystalline polypropylene which comprises polymerizing propylene in the presence of a catalyst system formed by reducing titanium tetrachloride with aluminum in the presence of diphenyl ether and washing the resulting catalyst with cyclohexyl chloride to increase substantially the catalyst activity of said catalyst system.

17. The method for producing solid, crystalline polypropylene which comprises polymerizing propylene in the presence of a catalyst system formed by reducing titanium tetrachloride with aluminum in the presence of diphenyl ether and washing the resulting catalyst with amyl chloride to increase substantially the catalyst activity of said catalyst system.

18. The method for producing solid, crystalline polypropylene which comprises polymerizing propylene in the presence of a catalyst system formed by reducing titanium tetrachloride with aluminum in the presence of diphenyl ether and washing the resulting catalyst with benzyl chloride to increase substantially the catalyst activity of said catalyst system.

19. A catalyst prepared according to the process of claim 1.

20. A catalyst prepared according to the process of claim 4.

References Cited

UNITED STATES PATENTS

| | | | |
|---|---|---|---|
| 3,101,328 | 8/1963 | Edmonds | 260—93.7 |
| 3,146,224 | 8/1964 | Coover | 260—93.7 |
| 3,072,630 | 1/1963 | Ide de Jong | 260—94.9 |
| 3,177,195 | 4/1965 | Steitz | 260—94.9 |

FOREIGN PATENTS

| | | |
|---|---|---|
| 790,399 | 2/1958 | Great Britain. |
| 814,837 | 6/1959 | Great Britain. |

JOSEPH L. SCHOFER, *Primary Examiner.*

M. B. KURTZMAN, *Assistant Examiner.*